(12) United States Patent
Li et al.

(10) Patent No.: US 6,912,383 B1
(45) Date of Patent: Jun. 28, 2005

(54) IMPLEMENTING METHOD FOR ADDING MONETARY VALUE OF MOBILE PREPAYMENT SERVICE IN DIFFERENT LOCATIONS

(75) Inventors: Mofang Li, Shenzhen (CN); Yongping Shang, Shenzhen (CN); Weihua Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 414 days.

(21) Appl. No.: 09/857,588

(22) PCT Filed: Jun. 16, 2000

(86) PCT No.: PCT/CN00/00162

§ 371 (c)(1),
(2), (4) Date: Jun. 7, 2001

(87) PCT Pub. No.: WO01/35628

PCT Pub. Date: May 17, 2001

(30) Foreign Application Priority Data

Nov. 11, 1999 (CN) .......................... 99121299 A

(51) Int. Cl.$^7$ ............................ H04M 11/00
(52) U.S. Cl. ................ 455/406; 455/405; 455/407; 455/408; 455/461; 379/114.2
(58) Field of Search ................ 455/406, 408, 455/407, 405, 461; 379/114.19, 114.2, 126; 709/227

(56) References Cited

U.S. PATENT DOCUMENTS

| 5,774,533 | A | * | 6/1998 | Patel ...................... 379/127.03 |
| 5,940,755 | A | * | 8/1999 | Scott ....................... 455/426.1 |
| 5,987,118 | A | * | 11/1999 | Dickerman et al. ..... 379/265.01 |
| 6,044,259 | A | * | 3/2000 | Hentila et al. .............. 455/406 |
| 6,122,352 | A | * | 9/2000 | Kangas et al. ......... 379/114.29 |
| 6,434,379 | B1 | * | 8/2002 | Despres et al. ............. 455/406 |
| 6,463,141 | B1 | * | 10/2002 | Tuunanen et al. ...... 379/201.05 |
| 6,625,268 | B1 | * | 9/2003 | Wallenius .............. 379/114.28 |

* cited by examiner

Primary Examiner—William Trost
Assistant Examiner—Marcos Torres
(74) Attorney, Agent, or Firm—Trop, Pruner & Hu, P.C.

(57) ABSTRACT

The invention discloses a method, which implements recharging at different locations for mobile prepaid service, based on intelligent network. The method sets SDP of intelligent network outside of SCP. All rechargeable card data of mobile prepaid service are stored in the said SDP. When mobile prepaid service subscriber dials access number for recharging, call is routered to SSP. After analyses signaling number of the call, SSP determines home SCP of it and reports intelligent call to the home SCP. Then, all the recharging procedure is controlled by the home SCP. The home SCP updates subscriber data and rechargeable card state, through interaction with the said SDP. By implementing the invention method, complication of engineering, data management and statistic is reduced and it is easier to expand.

7 Claims, 2 Drawing Sheets

IMPLEMENTING METHOD FOR ADDING MONETARY VALUE OF MOBILE PREPAYMENT SERVICE IN DIFFERENT LOCATIONS

FIELD OF THE INVENTION

The present invention relates generally to a field of service providing with the network terminal, and more particularly to a method implements recharging at different locations for mobile prepaid service, based on intelligent network.

BACKGROUND OF THE INVENTION

Along with fast development of mobile network and highly competition in the market, it is one of important manners to raise service by providing diverse and multiple level services. Mobile prepaid service is one of new services. It is not only welcomed by subscribers, but also has many advantages for operator, such as increasing profit, expanding market share, getting telephone fee in advance and avoiding bad debt etc. The so-called mobile prepaid service is: after a mobile telephone subscriber opens an account, he (she) purchases rechargeable card with fixed amount of face value to recharge his (her) account. When making a call, connect or disconnect the call depends on account balance. The balance in the account is calculated in real-time while the call is going on. When balance in the account is spent out, the call is disconnected. In this way, subscriber implements prepaid function for call and other services.

Intelligent network, which creates new services rapidly and effectively, is one kind of the "value-added" network, which is characterized of creating new service rapidly and loading upgrade service dynamically. Therefore, as intelligent network is rapid, convenient, flexible, economic and effective for creating and implementing various new services based on the existing mobile network, it is an effective manner to support prepaid service and other mobile intelligent service.

Intelligent network includes mainly following entities: service switching point (SSP), service control point (SCP), service data point (SDP), service management point (SMP), service management access point (SMAP) and intelligent peripheral (IP) etc. SSP performs mainly separating switching and service. It detects an intelligent call and processes it with SCP interactively. SCP executes service logic for the intelligent call detected by SSP and instructs SSP to execute corresponding call control, such as operations of connect, release etc. SMP performs mainly service management and subscriber management. SMAP is mainly used for SMP and SCP data access. IP provides mainly voice operation, receiving number and voice synthesis etc., usually IP is integrated in SSP called SSP/IP.

SDP is an important part of intelligent network. It stores data of intelligent network and includes service data function (SDF). In ITU-T Q.122x series recommendations, SCP and SDP interconnection interface protocol is defined, SCF-SDF interface specification is described in detail. SDF is acronym of Service Data Function, means function of service data. Acting as an interface of service logic and service database, sometimes, SDF function is abstracted as SDP entity. Usually, SCP includes service control function (SCF) and SDF function, and provides access database service to other SCP, through SCF-SDF interface.

Along with gradually expansion of prepaid service, subscribers of the service increase continuously. From the security point of view, it can not store too many subscriber data in single SCP. Thus, a mobile intelligent network with large capacity has many SCPs. Prepaid service subscribers of different locations are distributed to corresponding SCPs. According to present technology, usually, SDP is set in SCP. Therefore, after setting up many SCPs, rechargeable card data are distributed to each individual SCP accordingly. For example, suppose prepaid subscriber of location A roams to location B and purchases a rechargeable card of location B for prepaid purpose. As the subscriber data is in the SCP of location A, and rechargeable card data is in the SCP of location B, so the SCP of location A wants to query and update rechargeable card information in the SCP of location B. Under this mode, any two SCPs need to be interconnected, and network topology is mesh network architecture. This is complicated and difficult for setting up a network and engineering implementation. In addition, as the rechargeable card data are distributed, complication is increased for engineering, data management and statistic.

SUMMARY OF INVENTION

The present invention provides mobile prepaid service a recharging method at different locations, based on intelligent network, and further provides specific operation signaling procedure between SCP-SDP to implement the method.

A method, based on intelligent network, of the invention implements recharging at different locations for mobile prepaid service comprises followings.

Set up, independently, SDP of intelligent network outside of SCP and store all rechargeable card data of mobile prepaid service in the said SDP.

When a mobile prepaid subscriber dials access number of recharging service, call is routed to SSP. The SSP analyses calling number and decides the home SCP it belongs. Then, SSP reports the intelligent call to the home SCP. After that, whole recharging procedure is controlled by the home SCP. By interaction between home SCP and the said SDP, subscriber data and state of rechargeable card are updated.

The said whole recharging procedure, controlled by home SCP of the subscriber, includes followings. After home SCP receives a intelligent call from SSP, it instructs SSP to play announcement and collect user information. It prompts the subscriber to enter password of the rechargeable card and interacts with SDP. When it receives a success acknowledge from SDP, it disconnects from SDP and instructs SSP to play announcement of recharging success.

The said interaction between home SCP and SDP includes:

Home SCP establishes a dialogue with SDP. It sends a request to SDP for query of rechargeable card information. At the same time, it sends password of rechargeable card and handset number of recharging subscriber together to SDP.

SDP matches database, set the rechargeable card in use state mark and sends back the rechargeable card information, including state of the card, to home SCP.

According to the state of rechargeable card, home SCP executes corresponding operations. If the rechargeable card is in available state, then it updates the prepaid account according to rechargeable card information said above. After updating succeeds, it sends an updating request for state of rechargeable card to SDP.

SDP sets state of the rechargeable card in having been used state and sends back operation result to home SCP.

After home SCP receives response, it disconnects from SDP and executes corresponding operation.

By setting independent SDP in intelligent network, all rechargeable card data of mobile prepaid service are stored unitedly in an independent SDP. Subscriber's home SCP can query and update rechargeable card information through SCF-SDF interface. This implements recharging at different locations.

As data of rechargeable cards are stored unitedly, any two SCPs need not be interconnected again and SCP only needs to interact with SDP. The topology of network is a star architecture. This reduces greatly complication of engineering, data management and statistic. It also can be expanded easily.

The method of the invention not only adapts technology development trend, but also benefits interconnection of different vendors' equipment. Along with specification upgrades, SCP-SDP interconnection function will be richer, and a good base for future service development is established.

THE DRAWINGS

DETAIL DESCRIPTION OF THE INVENTION

In the following, the invention is described in detail with the embodiments and drawings.

Figure 1:
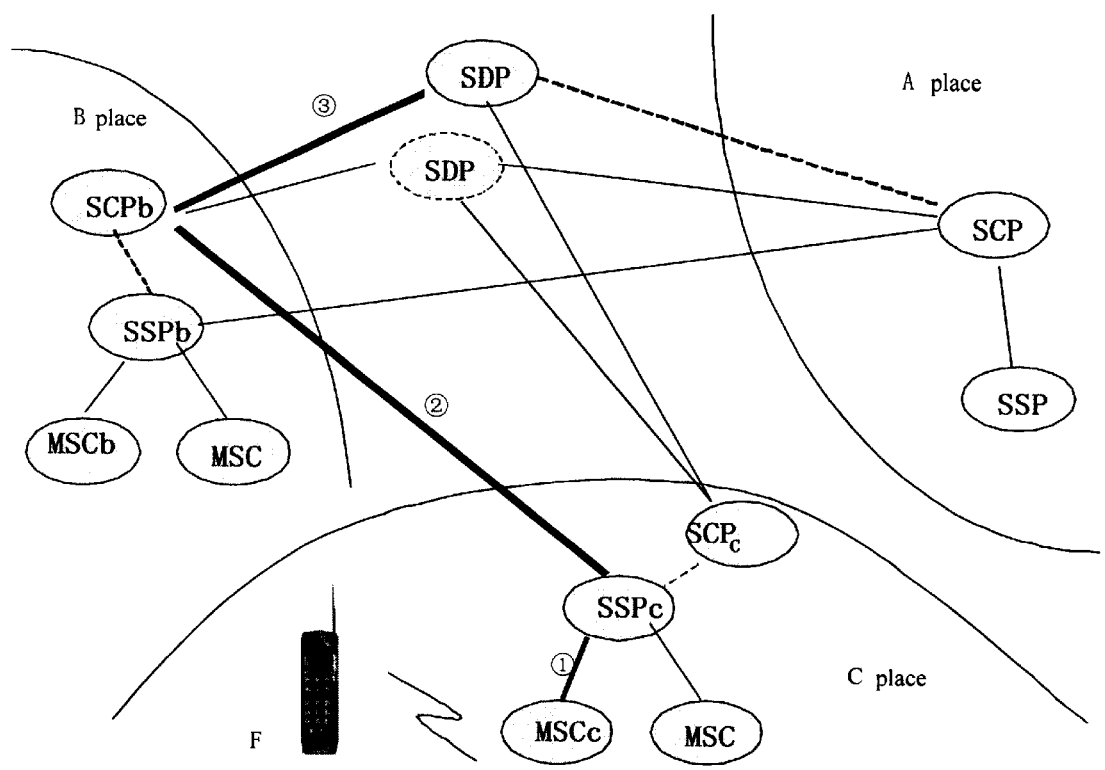
FIG. 1 is a mobile intelligent network for an embodiment of the invention. It is suitable to implement prepaid service with recharging at different locations.

As shown in FIG. 1, without losing its generality, suppose there is an intelligent network covers area A, B and C, in an embodiment of the invention. In the intelligent network, respective mobile switching center (MSC), SSP and SCP are set up in three areas and SDP is set up independently. Among them, SDP is an independent entity that stores rechargeable card information. The implementation procedure of prepaid service with recharging at different locations can be divided into three stages.

1. Call is Accessed to SSP and SSP Processes:

Suppose there is a subscriber F in area B. His service data is stored in the SCP b of area B. Also, suppose subscriber F roams to area C and registers his handset in the MSC c of area C. At this time, subscriber F purchases a rechargeable card, which information is stored in SDP. When subscriber F dials recharging number, call is got and analyzed by MSC c. As the MSC knows the number is a recharging number, it routes the call to SSP c. By analyzing the call, SSP c knows it is a recharging number too. According to calling handset number, SSP c finds the home SCP address (SCP b), then the call information is reported to SCP b and waits for a instruct from SCP b.

2. Home SCP Processes:

After receiving the information from SSP c, SCP b controls whole recharging procedure. Through instructing SSP to play announcement and collect user information, subscriber F is prompted to enter password of the rechargeable card purchased. Moreover, dialogue with SDP is established.

3. Interaction Procedure with SDP:

At first, SCP b establishes a dialogue with SDP, then it sends to SDP a query request for the rechargeable card information. At the same time, the password of rechargeable card and subscriber F's handset number are sent to SDP. After receiving the request, SDP encrypts the password. With the encrypted password, SDP queries database to get rechargeable card information, which includes face value and validity date. This information together with a permission mark of recharging are sent to SCP b as a response of the request. After receiving the response from SDP, SCP b adds face value of rechargeable card to subscriber account and adds period of validity brought by rechargeable card to subscriber account too. After these operations are successful, SCP b sends an update rechargeable card request to SDP. Then, SDP sets the rechargeable card in state of having been used and sends back a successful acknowledge to SCP b, if the operation is successful. After receiving the successful acknowledge, SCP b disconnects from SDP. Then, with announcement playing through SSP c, subscriber F is informed with success of recharging, new balance and new period of validity. A recharging procedure is finished.

Figure 2:
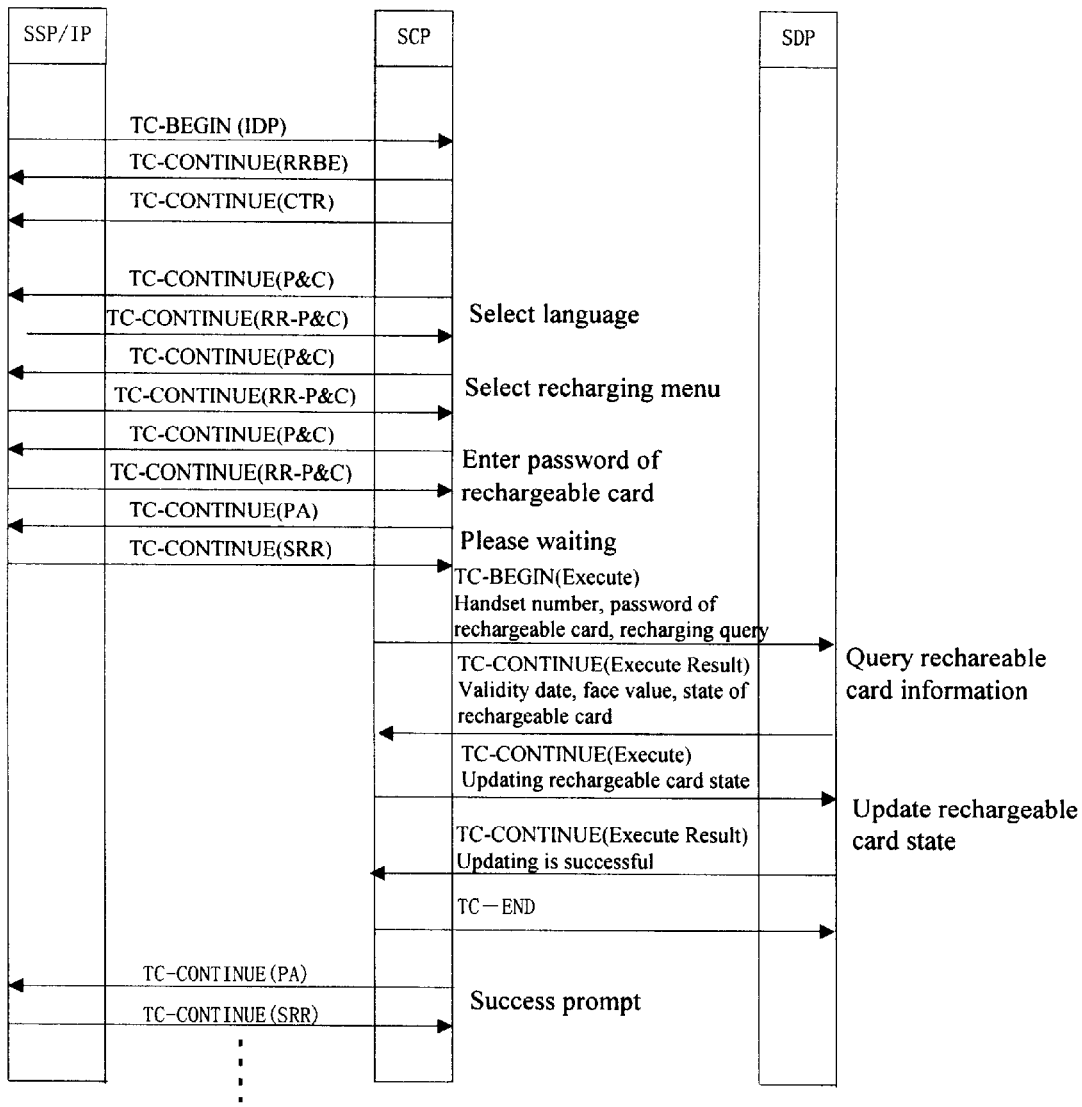
FIG. 2 is signaling flowchart of prepaid service with recharging at different locations.

In the invention, interconnection between SCP and SDP applies Signal System No. 7 (SS 7). Based on SS7 transaction capabilities application part (TCAP), Execute operation defined in ITU-T Q1228 recommendation is used to execute pre-defined operations and return its result. As shown in FIG. 2, in an embodiment of the invention, suppose that: prepaid service is implemented by mobile intelligent network. A prepaid service subscriber roams in whole network and a unified service interface is provided. This means that when a subscriber roams to visiting location and purchases local rechargeable card, he (she) can also dial a unified access number to recharge. The recharging procedure is transparent to any subscriber, i.e. with the same service interface of recharging as in the home location. The recharging service signaling flow is as followings.

1. After a prepaid service subscriber dials the unified access number, SSP/IP first analysis the calling number. If it is a prepaid subscriber, then an intelligent call to its home SCP is triggered. Signaling from SSP/IP to SCP is initiating DP (Detection Point) as shown in FIG. 2 IDP. This guarantees that recharging service interface is unified for the subscriber home location or visiting location.

2. Subscriber home SCP prompts to subscriber that: select prompt language (first P&C in FIG. 2), select recharging flow (second P&C) and enter password of the rechargeable card (third P&C). After receiving rechargeable card password from SSP/IP, home SCP intercats with SDP and sends rechargeable card password and handset number to independent SDP.

In Execute operation of this embodiment, type of id_oi_serviceKey, $id_{13}$ $mt_{13}$ ppsSuppluRetrieve etc. is Object Identifier. Values of them are identically allocated by operator. Their meaning are as following:

id_oi_serviceKey means service key, id_oi_accountNum means password of rechargeable card, id_oi_msisdn means handset number, id_oi_accountLeft means face value of rechargeable card, id_oi_activeDays means validity period of rechargeable card, id_mt_ppsSupplyRetrieve means a methodID for query information of rechargeable card, including password scrambling and matching, id_mt_ppsSupplyModify mans a methodID for updating state of rechargeable card.

Parameters and Values of First Time Execute Operation are as Following:

SCP sends Execute operation (query rechargeable card information)

```
ExecuteArg {
    object [0]={
        {type=service key ID (id_oi_serviceKey),
            value=service key value, set to 2 (integer 4)
        }
        {type=rechargeable card password ID (id_oi_
            accountNum),
            value=rechargeable card password entered by
                subscriber, such as "0113909355572150834"
                (general string)
        }
    }
    methodID [1]=query rechargeable card information ID
        (id_mt_ppsSupplyRetrieve)
    InputAssertion [2]={
        {type=handset number ID (id_oi_msisdn)
            value=subscriber prepaid handset number, such
                as "13903000001"
                (general string)
        }
    }
}
```

3. After receiving Execute operation, SDP encrypts the password of rechargeable card and matches it in database. If match is successful, and then the rechargeable card is set in state of being used, in order to avoid that two subscribers are using a same rechargeable card for recharging. Balance, period of validity and state of rechargeable card are returned as Execute operation results to subscriber's home SCP.

Parameters and values of first time Execute operation result are as following:
SDP returns Execute operation result (return query result)

```
ExecuteResult {
    methodID [1]=query rechargeable card information ID
        (id_mt_ppsSupplyRetrieve)
    OutputAssertion [2]={
        {type=face value ID of rechargeable card (id_oi_
            accountLeft)
            value=face value of rechargeable card, such as
                10000 (integer 4)
        }
        {type=valid period ID of rechargeable card (id_13 oi_13
            activeDays)
            value=valid period of rechargeable card, such as
                30 (integer 4)
        }
    }
    SpecificOutput [3]=}
        {value=state mark of rechargeable card, such as 1
            (integer 4)
        }
    }
}
```

SpecificOutput meanings in ExecuteResult are:
0: rechargeable card is not existing
1: rechargeable card is available
2: rechargeable card is invalid 4. After receiving Execute operation result, if the rechargeable card is invalid, home SCP prompts subscriber a voice response "Your rechargeable card is invalid", disconnects from SDP and releases call. If the rechargeable card is valid, then according to the information, included in Execute operation result, of the rechargeable card, balance and validity date of subscriber account are added. After it is successful, Execute operation is sent to SDP for request to update state of rechargeable card.

Parameters and Values of Second Time Execute Operation are as Following:
SCP sends Execute operation (request to update state of rechargeable card)

```
ExecuteArg {
    object [0]={
        {type=service key ID (id_oi_serviceKey)
            value=value of service key, such as 2 (integer 4)
        }
    }
    methodID [1]=update rechargeable card state ID
        (id_mt_ppsSupplyModify)
}
```

5. After receiving the Execute operation, SDP updates the rechargeable card to having been used state and records handset number of last Execute operation for statistic and query purposes.

Parameters and Values of Second Time Execute Operation Result are as Following:
SDP returns Execute operation result (return update result)

```
ExecuteResult {
    methodID[1]=update rechargeable card state ID
        (id_mt_ppsSupplyModify)
    SpecificOutput[3]={
        {value=success or failure mark of updating rechargeable card state, such as 1 (integer 4)
        }
    }
}
```

SpecificOutput Meaning in ExecuteResult are:
0: update failure
1: update success In this embodiment, two Execute operations are applied for recharging at different locations, i.e. update subscriber data first, and then update rechargeable card state. This is different from one Execute operation, which, in SDP, updates rechargeable card first, then updates subscriber data. This is to avoid that, at an extreme situation such as singling link is abnormal, when rechargeable card has been updated to invalid, but the balance of subscriber account has not been increased. In this way, subscriber interest is protected.

In this embodiment, Execute operation is based on SS7 TCAP layer. With this interconnection mode, it is unnecessary to set up additional network. SDP has independent signaling point and makes addressing by SS7 signaling. SS7 signaling network has low delay, high reliability and large capacity, with which requirement of query information for processing call of SCP can be satisfied greatly. At the same time, as SS7 signaling is point-to-point transfer, so it is high security, uneasy to intercept, modify and simulate and more adequate to transfer service data. With reasonable design of interconnection access operation, there is also no transmission pressure on SS7 signaling network.

For various abnormal situations, technical scheme of the invention has perfectly processed. For example, suppose after receiving first Execute operation, SDP does not receive second Execute operation. In this case, with an timeout mechanism, SDP can clean being used state of rechargeable card to avoid rechargeable card locked abnormally. Another example, there are facilities to avoid many subscribers use the same card to recharge simultaneously. Also, when dialogue is abnormal, there are timeout processing and rollback mechanisms. All of them guarantee that recharging at different locations is processed correctly.

The practical network of the invention can be more complicated then the one said above. MSC and SSP can be set separately or within single entity. There is multiple SDPs store rechargeable card information (as shown in dot line SDP in FIG. 1). When there is multiple SDPs, after receiving a rechargeable card password, according to the number of rechargeable card password SCP determines the home SDP and interacts with it. This is the only flow difference with the one only has one SDP. Other specific signaling flow of multiple SDP is same with single SDP.

What is claimed is:

1. A method for implementing a recharging operation at different locations for a mobile prepaid service based on an intelligent network which comprises at least a Service Switching Points (SSP), a Service Control Point (SCP) and a Service Data Point (SDP), comprising:

setting up at least an independent SDP inside an intelligent network and storing data of all rechargeable cards for mobile prepaid service at said at least a SDP collectively;

after a SSP detects a recharging call from a subscriber of mobile prepaid service, the SSP determining a home SCP of the subscriber and initiating a recharging request to the home SCP; and modifying subscriber data firstly and then changing a state of a rechargeable card through two interactive operations between said home SCP and said at least a SDP so as to complete a recharging operation for mobile prepaid service.

2. The method according to claim 1, wherein the steps of modifying subscriber data firstly and then changing a state of rechargeable card comprises:

establishing a dialogue between the home SCP and a corresponding SDP, and sending a request message for querying information of the rechargeable card to the SDP from the home SCP, wherein the request message carries a password of the rechargeable card and a handset number of the subscriber;

setting a state of the rechargeable card at a use state, and sending back a message carrying the information of the rechargeable card to the home SCP from the SDP after the SDP searches a database in which data of rechargeable cards are stored, wherein the information of the rechargeable card includes the information about the state of the rechargeable card;

updating the prepaid account according to information about the state of the rechargeable card, then sending a request for modifying the state of the rechargeable card to the SDP from the home SCP; and setting the state of the rechargeable card at a used state in the SDP, and sending back the operation result to the home SCP.

3. The method according to claim 2, wherein an SS7 signaling mode is applied in the interactive operations between the home SCP and the SDP.

4. The method according to claim 3, wherein the request message for querying information of the rechargeable card is sent to the SDP through an Execute operation in which parameters and values respectively include service key ID, password ID of the rechargeable card, handset number ID and the specific values thereof;

the message carrying the information of the rechargeable card is sent to the home SCP through an Execute operation result in which parameters and values respectively include face value ID of rechargeable card, valid period ID of rechargeable card, state mark of rechargeable card and the specific values thereof;

the request for modifying state of the rechargeable card is sent to the SDP through an Execute operation in which parameter and value respectively include service key ID and the specific value thereof; and the operation result is sent to the home SCP through an Execute operation result in which parameter and value respectively include a mark indicating success or failure of updating state of rechargeable card and the specific value thereof.

5. The method according to claim 1, after the step of initiating a recharging request to the home SCP, further comprising:

the home SCP sending a message instructing the SSP to play a voice announcement for notifying the subscriber to enter password of the rechargeable card, and initiating the interactive operations between the home SCP and a SDP;

when receiving a successful response from the SDP, the home SCP disconnecting the dialogue between the home SCP and the SDP and sending a message instructing the SSP to play a voice announcement for notifying the subscriber of a successful recharging operation.

6. The method according to claim 1, wherein the same number is applied for the recharging requests from subscribers at different locations.

7. The method according to claim 1, wherein more than one SDP is set up inside the intelligent network;

the method further comprising the step of determining a corresponding SDP to which the rechargeable card belongs according to password of the rechargeable card before the steps of modifying subscriber data firstly and then changing the state of rechargeable card.

* * * * *